US007542272B2

(12) United States Patent
Pike et al.

(10) Patent No.: US 7,542,272 B2
(45) Date of Patent: Jun. 2, 2009

(54) ROTATABLE COOLING FANS AND METHOD FOR USE

(75) Inventors: Jimmy D. Pike, Georgetown, TX (US); Gary B. Kotzur, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 11/240,411

(22) Filed: Sep. 30, 2005

(65) Prior Publication Data

US 2007/0076368 A1 Apr. 5, 2007

(51) Int. Cl.
*G06F 1/16* (2006.01)

(52) U.S. Cl. ............................ 361/679.48; 361/679.46; 415/80.3

(58) Field of Classification Search ................ 361/679, 361/683, 687, 695, 724–727; 312/223.1, 312/223.2, 236; 165/DIG. 138, 139, 140, 165/145, 152, 153, 307, 54, 80.3; 415/208.2
See application file for complete search history.

(56) References Cited

U.S. PATENT DOCUMENTS

| | | | | |
|---|---|---|---|---|
| 2,313,413 A | * | 3/1943 | Weske | 415/193 |
| 4,773,310 A | * | 9/1988 | Corwin | 454/244 |
| 5,050,667 A | * | 9/1991 | Berner et al. | 165/4 |
| 5,490,557 A | | 2/1996 | Taylor | 165/54 |
| 5,955,955 A | * | 9/1999 | Corcoran et al. | 340/607 |
| 6,183,203 B1 | * | 2/2001 | Grintz | 416/246 |
| 6,244,818 B1 | * | 6/2001 | Chang | 415/208.2 |
| 6,626,653 B2 | * | 9/2003 | Lin et al. | 417/423.5 |
| 6,663,342 B2 | * | 12/2003 | Huang et al. | 415/121.2 |
| 6,711,015 B2 | * | 3/2004 | Syring et al. | 361/695 |
| 6,752,587 B2 | * | 6/2004 | Lin et al. | 415/66 |
| 6,799,942 B1 | * | 10/2004 | Tzeng et al. | 415/61 |
| 6,822,863 B1 | | 11/2004 | Artman et al. | 361/695 |
| 6,856,941 B2 | * | 2/2005 | Bradbury et al. | 702/182 |
| 7,012,806 B2 | * | 3/2006 | Jones et al. | 361/686 |
| 2006/0199498 A1 | * | 9/2006 | Shipley et al. | 454/184 |
| 2007/0047200 A1 | * | 3/2007 | Huang | 361/695 |

* cited by examiner

*Primary Examiner*—Jayprakash N Gandhi
*Assistant Examiner*—Anthony Q Edwards
(74) *Attorney, Agent, or Firm*—Baker Botts L.L.P.

(57) ABSTRACT

A rotatable fan system and method is disclosed in which an array of paired fans is included as part of an information handling system. The array of paired fans can be rotated so that the interior fan becomes the exterior fan. The array includes an electrical switch for reversing the rotational direction of the blades of the paired fans following the rotation of the fan array.

19 Claims, 2 Drawing Sheets

ROTATABLE COOLING FANS AND METHOD FOR USE

TECHNICAL FIELD

The present disclosure relates generally to information handling systems, and, more particularly, rotatable cooling fans and a method for using rotatable cooling fans in an information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. Information handling systems and computer systems often employ one or more fans to blow air over components of the system.

SUMMARY

In accordance with the present disclosure, a rotatable fan system and method is disclosed in which an array of paired fans is included as part of an information handling system. The array of paired fans can be rotated so that the interior fan becomes the exterior fan. The array includes an electrical switch for reversing the rotational direction of the blades of the paired fans following the rotation of the fan array.

The rotatable fan system and method disclosed herein is technically advantageous because it provides a system for servicing or hot swapping a fan of a computer system. Because each fan can be rotated to the exterior of the computer system, each fan can be serviced without the necessity of opening the housing of the computer system or shutting down the computer system. Another technical advantage of the rotatable fan system and method disclosed herein is that the system permits the servicing of one fan while the other fan continues to operate. While the outer fan is being serviced the inner fan can continue to rotate and cool the interior of the housing of the information handling system or computer system. Another technical advantage of the rotatable fan system described herein is that the system responds to the rotation of the fan array by reversing the direction of rotation of the blades of the fans of the fan array, thereby causing the fans to direct air in the original direction despite the rotation of the fan array. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
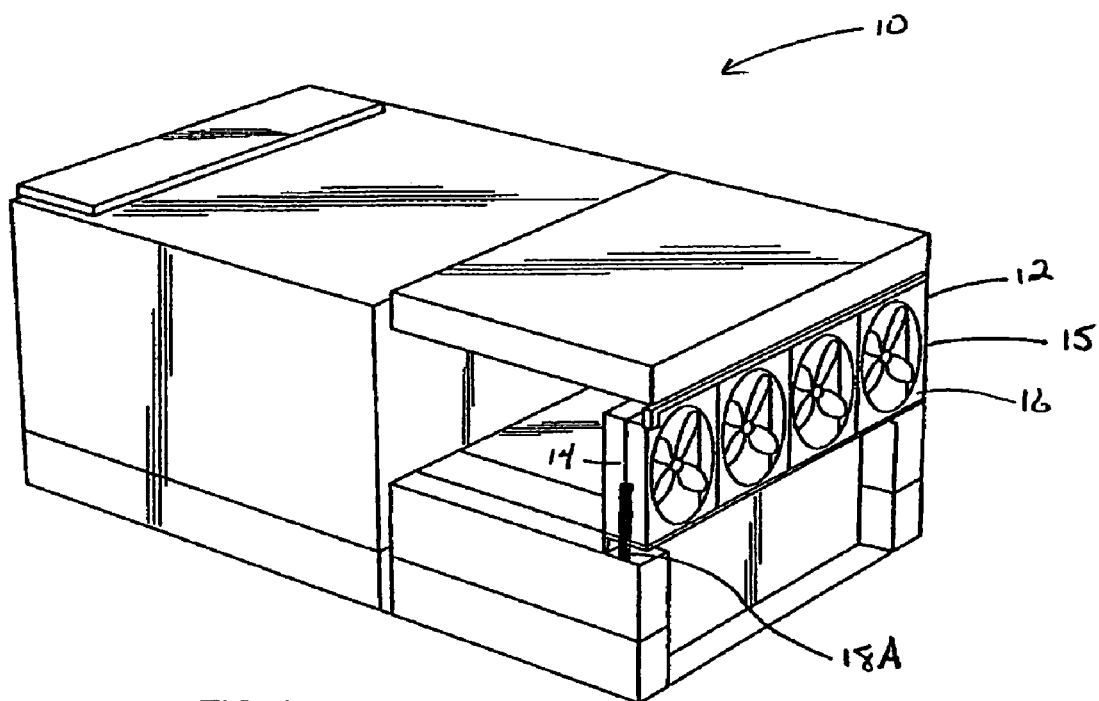
FIG. 1 is a pictorial view of information handling system that includes an array of paired fans.

FIG. 1 is a pictorial view of information handling system or computer system, which is indicated generally at 10. Arranged on one end of system 10 is an array 12 of paired cooling fans 15. Each set of paired or bundled cooling fans includes two fans, an inner fan 14 and an outer fan 16. The inner fan and outer fan are aligned such that the air pathway of each fan is generally coextensive. The identification of a fan as an inner fan or an outer fan is based upon the location of the fan relative to the interior of the system. The inner fan is located closer to the interior of the system and is not accessible to a user on the exterior of the system; an outer fan is located on the exterior of the system and is accessible on the exterior of the system. The movement of the fans causes air to flow into our out of the interior of the system. Depending on the architecture of the system, the fans could be arranged to direct air into the system. Alternatively, the fans could serve as an exist point for air and direct air out of the interior of the system.

Figure 2:
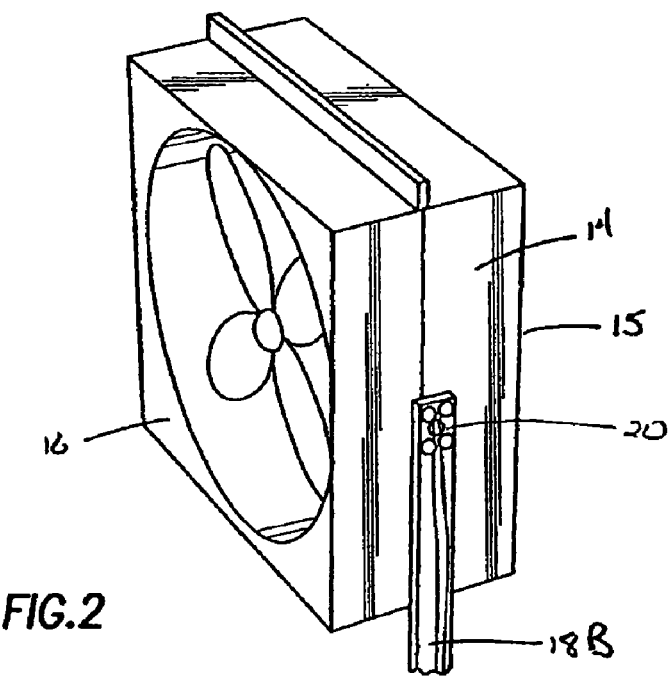
FIG. 2 is a pictorial view of a paired set of cooling fans.

In the example of FIG. 1, the array 12 of cooling fans includes four sets 15 of paired cooling fans. A post 18 is positioned on each side or end of the array. Coupled between the posts 18 is a bar that runs through the center of each of the sets of paired cooling fans. The bar serves as an axis of rotation for each of the sets of paired cooling fans. A first post is shown at 18A in FIG. 1, and a second post is shown at 18B in FIG. 2. FIG. 2 is a pictorial view of one paired set of cooling fans coupled to a post. The paired cooling fan 15 of FIG. 2 includes inner fan 14 and outer fan 16. Shown on post 18B is an electrical switch or actuator 20. Switch 20 is operable to cause the rotors to reverse their direction of rotation, thereby reversing the direction of rotation of the blades of the fan. Switch 20 can also remove power from one or more of the fans. In one embodiment of the present invention, each paired fan of the fan array can be separately actuated. In another embodiment of the present invention, each fan of a paired fan can be separately actuated.

Figure 3:
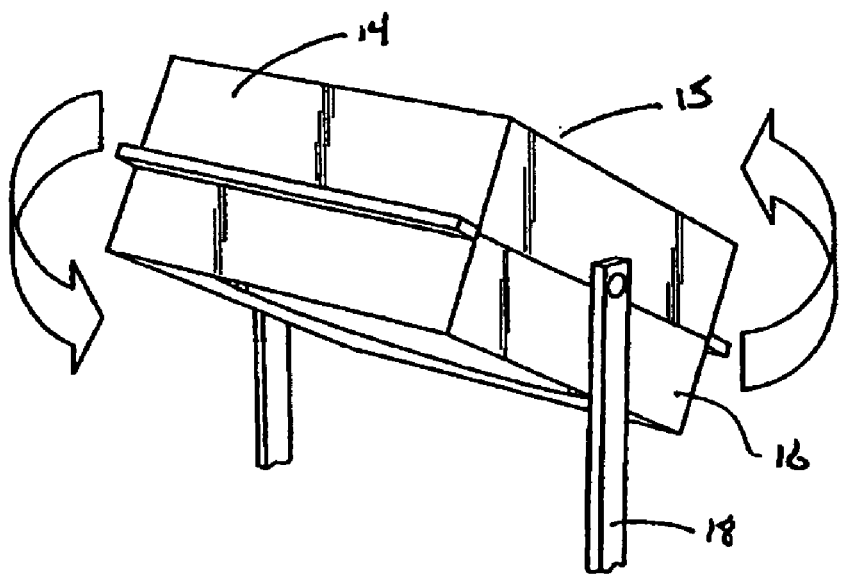
FIG. 3 is a pictorial view of a paired fan being rotated about its rotational axis.
Figure 4:
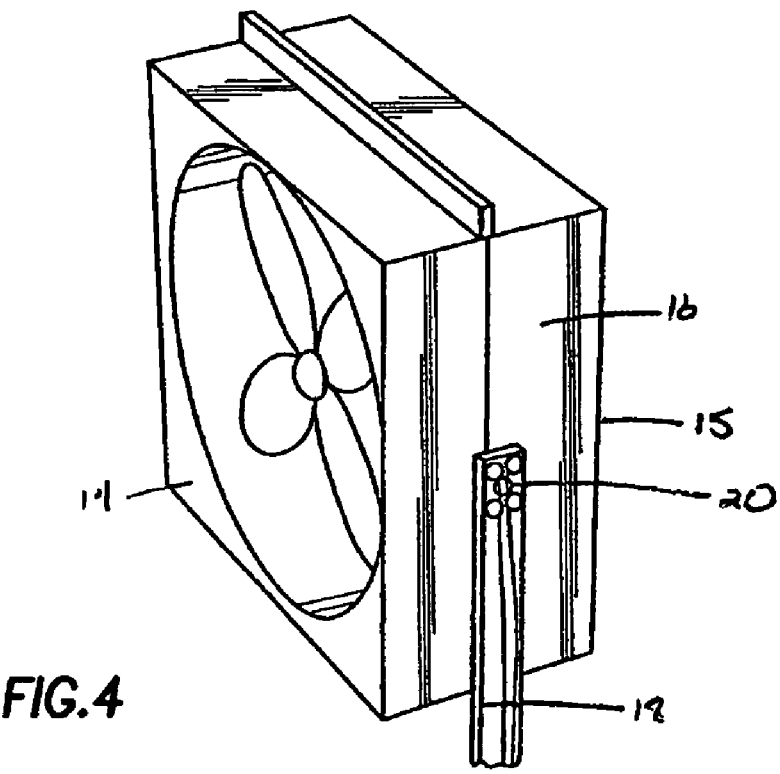
FIG. 4 is a pictorial view of a paired fan following the rotation of the paired fan about its rotational axis.

Each paired fan can be rotated around the axis of the bar that runs through the center of the paired fan. Shown in FIG. 3 is a paired fan 15 that is being rotated about its rotational axis. The rotation of the fan occurs in the vertical direction such that the top of the paired fan becomes the bottom of the paired fan following the vertical inversion of the paired fan. Shown in FIG. 4 is a pictorial view of a paired fan following a 180° rotation of the paired fan about its rotation axis. Following the rotation, the fan 16 becomes the inner fan and fan 14 becomes the outer fan. Thus, following a 180° rotation of a paired fan, the fans have swapped position. The inner fan of the paired fan has become the outer fan, and the outer fan of the paired fan has become the inner fan. Following a 180° rotation of a paired fan, the switch is actuated to cause the blades of the fan to rotate in the opposite direction. The blades of a fan are typically canted or angled in a direction for aid the flow of air through the fan. When the fan is rotated, the direction of rotation of the fans must be reversed to continue the flow of air in the original direction. If less than all of the paired fan sets in the array are rotated, the direction of blade rotation of only those rotated fans is reversed by the electrical actuator 20. If all of the paired fan sets in the array are rotated, the blade rotation of all of the fans is reversed by the electrical actuator 20.

The rotatable fan of the present invention provides a mechanism for accessing, servicing, and performing a hot swap of an outer fan while an inner fan remains operational. If the inner fan of a paired fan were to fail or otherwise be in need of replacement, the paired fan is rotated 180°, allowing access to the outer fan (formerly the inner fan) at a time when the inner fan (formerly the outer fan) can remain operational. Thus, the ability to rotate the fans allows each fan of the system to be accessible and hot swappable. Because each set of paired fans is individually rotatable, any one fan of the array can be accessed and service without the necessity of rotating the entire array. Because a fan can be replaced without the necessity of powering down the system, the rotatable fan system of the present invention can be employed in high availability computer systems and information handling systems. It should also be recognized that the paired fans could be configured to rotate in the horizontal direction. In this arrangement the posts of the array would be positioned to permit alignment in the horizontal direction. The rotatable fan design of the present invention is not limited in its application to computer systems. Rather, the rotatable fan design described herein may be used with any system that employs a fan. Although the present disclosure has been described in detail, it should be understood that various changes, substitutions, and alterations can be made hereto without departing from the spirit and the scope of the invention as defined by the appended claims.

What is claimed is:

1. A fan array for an information handling system, comprising a plurality of sets of bundled fans, wherein each set includes at least two fans, wherein each set is rotatable 180° about an axis, and wherein the fan array further comprises an electrical switch operable to reverse the direction of rotation of the blades of the fans of a set of bundled fans.

2. The fan array of claim 1, wherein each set of bundled fans is individually rotatable.

3. The fan array of claim 1, wherein each set of bundled fans is rotatable about a rod through the center of each set of bundled fans.

4. The fan array of claim 1, wherein the plurality of sets of bundled fans includes a first end and a second end, and wherein the plurality of sets of bundled fans is coupled to a first post at a first end and a second post at a second end.

5. The fan array of claim 1, wherein the electrical switch is operable to reverse the direction of rotation of the blades of the fans of each set of bundled fans.

6. The fan array of claim 1, wherein the electrical switch is operable to reverse the direction of rotation of the blades of the fans of one set of bundled fans.

7. The fan array of claim 1,
wherein the electrical switch is operable to reverse the direction of rotation of the blades of the fans of one set of bundled fans; and
wherein each set of bundled fans is individually rotatable about a rod through the center of each set of bundled fans.

8. The fan array of claim 1,
wherein the electrical switch is operable to reverse the direction of rotation of the blades of the fans of each set of bundled fans; and
wherein the plurality of sets of bundled fans is individually rotatable about a rod through the center of each set of bundled fans.

9. The fan array of claim 1, wherein each set of bundled fans is rotatable in the vertical direction.

10. A rotatable fan system for an information handling system, comprising:
a first fan;
a second fan adjacent to and aligned with the first fan;
a rod positioned between the first fan and the second fan, wherein the first fan and the second fan can be rotated 180° about the rod in the vertical direction; and
an electrical switch operable to reverse the direction of rotation of the blades of the first fan and the second fan.

11. The rotatable fan system of claim 10, wherein the rod has a first end and wherein a post is coupled to the rod at the first end of the rod.

12. An information handling system, comprising:
a processor;
memory;
a housing;
an array of paired fan sets located in the housing, wherein each paired fan set comprises a first fan adjacent to and aligned with a second fan, wherein the array of paired fan sets is rotatable 180° about an axis; and wherein the array of paired fan sets comprises an electrical switch operable to reverse the direction of rotation of the blades of the fans in a paired fan set.

13. The information handling system of claim 12, wherein the array of paired fan sets is rotatable in the vertical direction.

14. The information handling system of claim 12, wherein the array of paired fan sets is rotatable in the horizontal direction.

15. The information handling system of claim 12, wherein the electrical switch is operable to reverse the direction of rotation of the blades of the fans in the array.

16. The information handling system of claim 13, wherein the array of paired fan sets is rotatable about a rod positioned in the center of the set of fans.

17. The information handling system of claim 16, wherein the rod includes a first end and a second end and wherein the first end and the second end are coupled to a post.

18. The information handling system of claim 12, wherein each paired fan set is individually rotatable.

19. The information handling system of claim 18, wherein the electrical switch is operable to reverse the direction of rotation of the blades of the fans in any one of the paired fan sets.

* * * * *